United States Patent
Hood et al.

(10) Patent No.: US 7,835,805 B2
(45) Date of Patent: *Nov. 16, 2010

(54) HMI VIEWS OF MODULES FOR INDUSTRIAL CONTROL SYSTEMS

(75) Inventors: Gavan W Hood, Upper Lockyer (AU); Kenwood H. Hall, Hudson, OH (US); Sujeet Chand, Brookfield, WI (US); Paul R. D'Mura, Glendale, AZ (US); Michael D. Kalan, Highland Heights, OH (US); Kenneth S. Plache, Scottsdale, AZ (US)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 254 days.

This patent is subject to a terminal disclaimer.

(21) Appl. No.: 11/536,746

(22) Filed: Sep. 29, 2006

(65) Prior Publication Data

US 2008/0082185 A1    Apr. 3, 2008

(51) Int. Cl.
 *G06F 19/00*    (2006.01)
(52) U.S. Cl. .......................... 700/20; 700/83
(58) Field of Classification Search .............. 700/1–2, 700/17–20, 83, 86, 89; 717/10–11, 9, 5; 709/1, 100, 202, 224, 303; 719/315
See application file for complete search history.

(56) References Cited

U.S. PATENT DOCUMENTS

| 5,485,620 A | 1/1996 | Sadre et al. |
| 5,522,066 A | 5/1996 | Lu |
| 5,530,861 A | 6/1996 | Diamant et al. |
| 5,812,394 A | 9/1998 | Lewis et al. |
| 5,946,681 A | 8/1999 | Shorter |
| 6,067,299 A | 5/2000 | DuRee |
| 6,085,222 A * | 7/2000 | Fujino et al. ............ 709/202 |
| 6,104,962 A | 8/2000 | Sastry |
| 6,269,254 B1 | 7/2001 | Mathis |
| 6,539,271 B2 * | 3/2003 | Lech et al. ............ 700/108 |

(Continued)

FOREIGN PATENT DOCUMENTS

DE    101 29 564 A1    9/2002

(Continued)

OTHER PUBLICATIONS

European Search Report for European Patent Application No. EP07117140, dated May 7, 2008, 8 pages.

(Continued)

*Primary Examiner*—Kidest Bahta
(74) *Attorney, Agent, or Firm*—Turocy & Watson LLP; William R. Walbrun; John M. Miller

(57) ABSTRACT

A human machine interface (HMI) interface for an industrial automation system is provided. A module is provided that employs resources and logic to expose functionality of the module while providing generic interfaces to external components of the module. A human machine interface (HMI) component associated with the module adapts functionality of a display based at least in part on a type of user or application. In addition to the display, the HMI component adapts functionality of one or more interface inputs based in part on the type of user or application.

22 Claims, 16 Drawing Sheets

U.S. PATENT DOCUMENTS

| | | | |
|---|---|---|---|
| 6,868,538 B1 | 3/2005 | Nixon et al. | |
| 7,016,759 B2* | 3/2006 | Kaever et al. | 700/173 |
| 7,043,311 B2 | 5/2006 | Nixon et al. | |
| 7,080,066 B1 | 7/2006 | Scheurich et al. | |
| 7,089,530 B1 | 8/2006 | Dardinski et al. | |
| 7,096,465 B1 | 8/2006 | Dardinski et al. | |
| 7,194,446 B1* | 3/2007 | Bromley et al. | 706/45 |
| 7,225,037 B2* | 5/2007 | Shani | 700/18 |
| 7,395,122 B2* | 7/2008 | Kreidler et al. | 700/18 |
| 7,418,305 B2* | 8/2008 | Buesgen et al. | 700/95 |
| 7,505,817 B2* | 3/2009 | McDaniel et al. | 700/18 |
| 7,509,249 B2* | 3/2009 | Britt et al. | 703/27 |
| 2002/0059272 A1 | 5/2002 | Porter | |
| 2002/0156548 A1 | 10/2002 | Arackaparambil et al. | |
| 2003/0150927 A1 | 8/2003 | Rosen | |
| 2003/0163656 A1 | 8/2003 | Ganton | |
| 2004/0199925 A1 | 10/2004 | Nixon et al. | |
| 2004/0230328 A1* | 11/2004 | Armstrong et al. | 700/83 |
| 2005/0125735 A1 | 6/2005 | Cohen et al. | |
| 2005/0256735 A1 | 11/2005 | Bayne | |
| 2006/0037008 A1 | 2/2006 | Stelzer et al. | |
| 2006/0179032 A1 | 8/2006 | Gottsman et al. | |
| 2006/0206448 A1 | 9/2006 | Hyder et al. | |
| 2006/0212146 A1* | 9/2006 | Johnson et al. | 700/89 |
| 2007/0089063 A1 | 4/2007 | Breyer | |
| 2007/0142941 A1* | 6/2007 | McGreevy et al. | 700/83 |
| 2007/0256051 A1 | 11/2007 | Rojer | |
| 2008/0022151 A1 | 1/2008 | Stange et al. | |
| 2008/0040477 A1* | 2/2008 | Johnson et al. | 709/224 |
| 2008/0140230 A1* | 6/2008 | Bromley | 700/83 |
| 2008/0201297 A1 | 8/2008 | Choi et al. | |

FOREIGN PATENT DOCUMENTS

| | | |
|---|---|---|
| EP | 1 772 785 A | 4/2007 |
| WO | 0195041 A1 | 12/2001 |
| WO | 02/31607 A | 4/2002 |
| WO | 2004086160 A1 | 10/2004 |

OTHER PUBLICATIONS

OA Dated Jan. 9, 2009 for U.S. Appl. No. 11/536,827, 18 pages.
Sweet, et al. Managing Technology Change in Industrial Automation. Proceedings of the Third IEEE Conference on Control Applications, Aug. 24-26, 1994, pp. 3-6, vol. 1. An ABB Overview of Research Priorities.
Maaref, et al. Communication System for Industrial Automation, Proceedings of the IEEE International Symposium on Industrial Electronics, Jul. 7-11, 1997. Laboratoire Logiciels System Reseaux-Image, IEEE, pp. 1286-1291.
OA Dated Oct. 6, 2008 for U.S. Appl. No. 11/536,715, 9 pages.
OA Dated Oct. 29, 2008 for U.S. Appl. No. 11/536,791, 43 pages.
OA Dated Oct. 7, 2008 for U.S. Appl. No. 11/536,760, 23 pages.
OA dated Mar. 24, 2009 for U.S. Appl. No. 11/536,715, 38 pages.
OA dated Apr. 23, 2009 for U.S. Appl. No. 11/536,760, 22 pages.
OA dated Apr. 17, 2009 for U.S. Appl. No. 11/536,791, 37 pages.
European Search report dated Nov. 20, 2009 for European Application No. EP 07 11 7192, 9 pages.
"SIMATIC, Working with STEP V5.1, Edition Aug. 2000, A5E00069681-03". Aug. 2000, Siemens, D-90327, Nurnberg, DE, XP002554626, 24 pages.
Fayad, et al. "HMI as a Maintenance Tool." Advances in Instrumentation and Control, Instrument Society of America, Research Triangle Park, US, vol. 2, part 1, Jan. 1, 1998, pp. 119-134, XP000875207, ISSN: 1054-0032, p. 124, last paragraph—p. 133, last paragraph, 16 pages.
OA dated Aug. 21, 2009 for U.S. Appl. No. 11/536,760, 17 pages.
OA dated Aug. 6, 2009 for U.S. Appl. No. 11/536,791, 38 pages.
OA dated Jun. 23, 2009 for U.S. Appl. No. 11/536,827, 22 pages.
OA dated Oct. 20, 2009 for U.S. Appl. No. 11/536,715, 41 pages.
OA dated Jan. 26, 2010 for U.S. Appl. No. 11/536,791, 39 pages.
OA dated Mar. 8, 2010 for U.S. Appl. No. 11/536,760, 19 pages.
OA dated Sep. 17, 2010 for U.S. Appl. No. 12/241,319, 32 pages.

* cited by examiner

HMI VIEWS OF MODULES FOR INDUSTRIAL CONTROL SYSTEMS

TECHNICAL FIELD

The subject invention relates generally to industrial control systems and more particularly to adaptable human machine interface functionality based on module types and users, where a module provides an abstract interface of logic and resources to perform an action.

BACKGROUND

Industrial controllers historically have operated in factory networks where a plurality of controllers and associated I/O modules communicate. These lower level control elements are often in communication with higher level computing systems or servers that aggregate data from the controllers and help to manage day-to-day activities of an enterprise. As systems have become more complex however, communications and functional cooperation between components has become a challenge. For instance, when users purchase multiple products from one or more vendors there is often limited interoperability and consistency between such products. Software and control engineers must then learn their unique product and how the components interact with each other. Limited product and component consistency suggest that techniques engineers learn in one product do not necessarily carry over to other implementations. In general, control and application systems use different interfaces that make mapping difficult; meanwhile qualified personnel that understand both hardware and software environments are in short supply and command high salaries.

Often times, integration of products (production and automation systems in particular) is too complex and difficult to manage. Process and control engineers cannot code and configure their respective components of a solution without concern for other system components. In addition, system startup metrics are generally not sufficient to supply clear and measurable information for the user/integrator. In one example, a user specifies a line production system with both control and software system components. The development (customization) and integration cost is significant allowing for long ramp-up and integration due to the complexity of connecting systems and uncertainty of how the system will perform. This has a significant impact beyond the cost of the control system as line commissioning and ramp-up are delayed during control system integration. A more predictable process and less complex system integration capability will reduce these costs.

Another problem with current control solutions is that users currently focus on implementation and glue logic rather than the production solution at hand. The underlying technical details have become a primary worry where engineers from multiple environments do not focus on process information (application level concerns) and values exchanged, rather they more often focus on the "how" not the "what." For instance, a user may decide to automate a manual section of their plant. The design may start at a high level but soon becomes a series of discussions regarding nonfunctional requirements e.g., DCOM, TCP, transaction rates, and the like. While these nonfunctional requirements are important, the design of functional requirements is where the true value is to the designer or end user. Thus, the user would prefer to focus on functional requirements (equipment control, product flow control, and so forth) providing direct improvements in value rather than dealing with superfluous technology issues.

In another case, system design does not sufficiently enable trade-offs between overhead burden (memory footprint, CPU cycles, and so forth) and application coupling. For instance, processing load should be better distributed across the system in accordance with system capabilities. Thus, if one part of the system is shut down, alternative processing capability should be in place to allow production to continue. For example, a user initially designs and installs a control system suiting their immediate needs. Incremental changes are then applied to controllers and often new interface functions are added to the human machine interface (HMI) for such controllers. Current solutions however do not facilitate a smooth and uncomplicated transition for the respective changes. Multiple technologies underneath many vendors' products complicate configuration and management of systems. This is also aggravated when third party systems are involved. Such complexity hinders the system's capacity to provide higher-level information and reduces its ability to easily configure such systems.

SUMMARY

The following presents a simplified summary in order to provide a basic understanding of some aspects described herein. This summary is not an extensive overview nor is intended to identify key/critical elements or to delineate the scope of the various aspects described herein. Its sole purpose is to present some concepts in a simplified form as a prelude to the more detailed description that is presented later.

Adaptable human machine interface (HMI) components are provided that interact with logical modules and provide variable interface capabilities to users depending on the type of user and/or module application at hand. The HMI components interact with a module that provides an association of logic with one or more resources, where the logic controls the state of the resources and the resources define components or states of a system that perform an action. Modules hide the user from internal interfaces, messages, and logic specific to the resources yet provide standard or generic interfaces to external systems.

The HMI components are fluid and adapt to the module application to provide an experience that is more focused to the current task of the user and the state of the system. For example, visual displays or interface inputs can change based upon the type of user or the desired operation that the user may be attempting. These include developer views that show all interfaces, logic, and data of the module; deployment views that show administrative elements of interest when configuring a system; runtime client and management views for debugging and maintenance of applications; and other resource/logic views for design and management of a control system or enterprise. By adapting and focusing the HMI to the current needs of the user or application, interactions with the system can be carried out in a more efficient manner thus reducing overall costs of the system.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

DETAILED DESCRIPTION

Systems and methods are provided to facilitate interaction with an industrial control system while mitigating interface requirements and integration nuances of diverse components of the system. In one aspect, a human machine interface (HMI) interface for an industrial automation system is provided. A module is provided that employs resources and logic to expose functionality of the module while providing generic interfaces to external components of the module. A human machine interface (HMI) component associated with the module adapts functionality of a display based at least in part on a type of user or application. In addition to the display, the HMI component adapts functionality of one or more interface inputs based in part on the type of user or application. It is noted that HMI components or modules can aggregate other HMI components or modules. Also, HMI modules can filter and rearrange views of published interfaces based on user or program roll and location. For example, an HMI developer can be provided with a different set of functionality than a control engineer.

It is noted that as used in this application, terms such as "component," "resource," "module," "model," and the like are intended to refer to a computer-related entity, either hardware, a combination of hardware and software, software, or software in execution as applied to an automation system for industrial control. For example, a component may be, but is not limited to being, a process running on a processor, a processor, an object, an executable, a thread of execution, a program and a computer. By way of illustration, both an application running on a server and the server can be components. One or more components may reside within a process and/or thread of execution and a component may be localized on one computer and/or distributed between two or more computers, industrial controllers, and/or modules communicating therewith.

Figure 1:
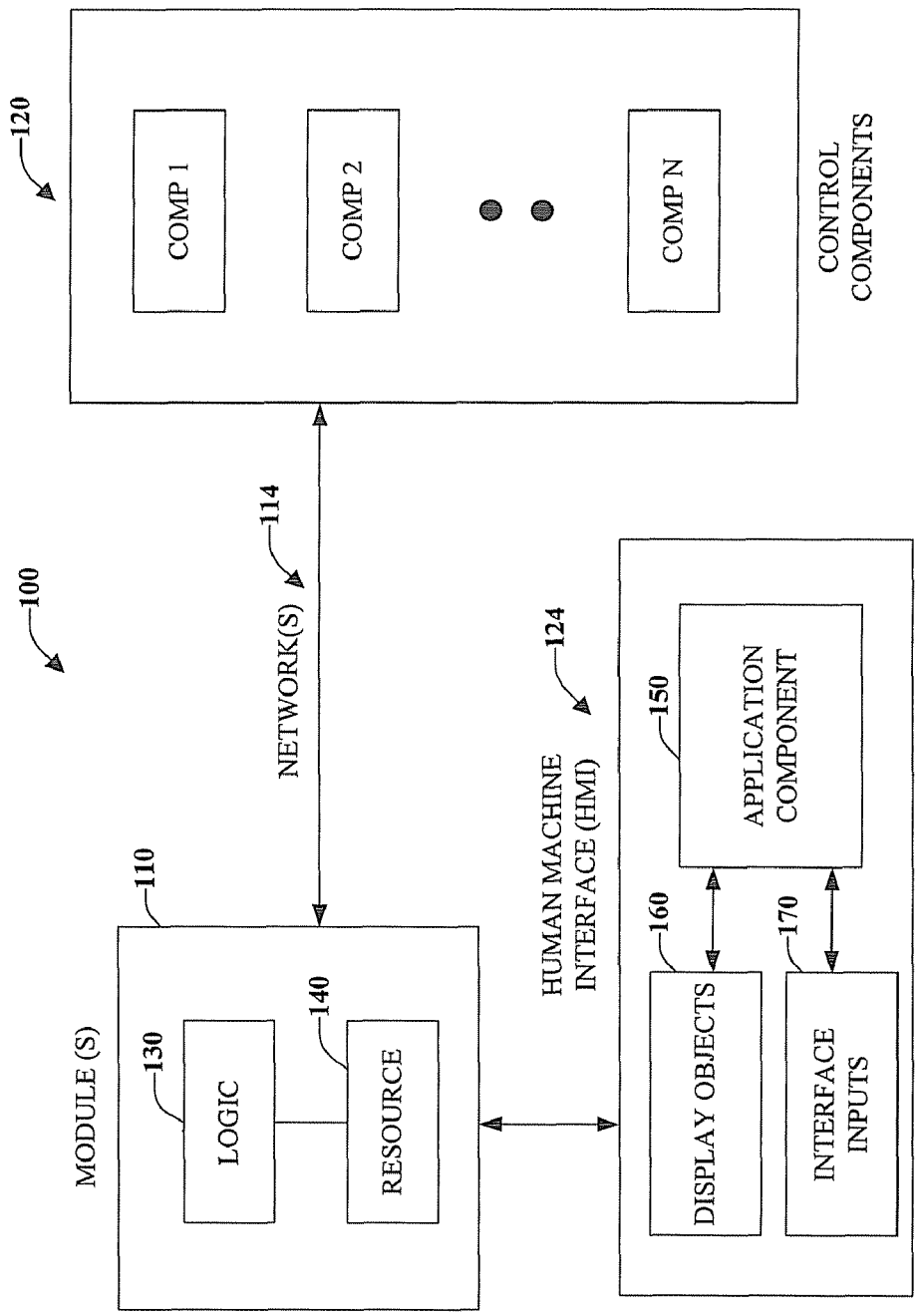
FIG. 1 is a schematic block diagram illustrating a human machine interface (HMI) and logical modules for an industrial automation system.

Referring initially to FIG. 1, a system 100 illustrates a module component 110 (hereinafter referred to as a module) and interface for an industrial automation system. The module 110 is employed to define, interface, and execute functionality of one or more industrial control system components 120 which are described in more detail below. As illustrated, the modules 110 can be accessed across a network 114 from the control components 120. The network 114 also allows online access to the modules 110 and their respective control components 120 and also enables creating the modules 110 in an offline manner such as in a computer database (not shown). When created offline, the modules 110 can subsequently be downloaded for execution on the control components 120. Modules 110 can be interfaced by users via a human machine interface (HMI) component 124 (described below) and/or can be configured to interact with a plurality of other modules 110 or control components 120.

In general, the module 110 is an association of logic 130 with one or more resources 140. The logic 130 includes program code that can alter the state of a resource 140 for example, ladder code, function chart, script, JAVA, C code, and so forth. The resources 140 are those components or elements that perform an activity in a system including equipment and personnel that perform work in a system. Other examples of types of resources 140 include Equipment, Material, Personnel, Segments and Storage. Personnel and equipment (machines) can perform activities in a system. Resources that can perform work can be classified as active resources (e.g., CNC machine, Injection molding machine), whereas other equipment resources can be considered passive resources (e.g., sensor, material). Module classes and templates can be maintained in libraries which facilitate access to desired system functionality and further promote system integration. Resources 140 can have various states associated therewith such as common S88 state classifications including idle, hold, abort, run, reset, stop, restart, and so forth where the module 110 can present logic 130 to represent state machines that manage the state of the resource 140.

An instance of the module 110 can be considered a real item in the automation system 100, typically viewed in an Organizational View, Geographical View, or Asset Management View, for example. In general, the HMI component 124 is adaptable to provide a desired view of the module 110 depending on the type of user or application involved as determined by an application component 150. The application component 150 determines the type of role for the user or determines a particular application that the user has selected and alters a display or "view" presented to the user, where the display provides one or more display objects 160 associated with an application. Adaptability includes adapting available inputs 170 or selection options available for the HMI component 124 depending on the role or type of user and/or application. For example, the role of the user may be determined from a database and when the user logs in, the role is determined from a table in the database. In other cases, the user may have different roles including design, administrative, maintenance, and so forth which can be determined by direct input from the user or inferred from the task at hand (e.g., application input selection defining role, intelligent components such as classifiers monitoring the application to determine role).

In addition to various hardware and/or software components, various interfaces 124 can be provided to manipulate the modules 110 and organizational data models as described in more detail below through various illustrative examples. For instance, a Graphical User Interface (GUI) can be provided to interact with module 110 or other components of the hierarchy such as any type of application that sends, retrieves, processes, and/or manipulates factory or enterprise data, receives, displays, and/or communicates data, and/or facilitates operation of the system 100. For example, such interfaces 124 can also be associated with an engine, server, client, editor tool or web browser although other types of applications can be utilized.

In addition to various hardware and/or software components, various interfaces 124 can be provided to manipulate the modules 110 and organizational data models described below where various examples are illustrated in more detail below. This can include a Graphical User Interface (GUI) to interact with the module 110 or other components of the hierarchy such as any type of application that sends, retrieves, processes, and/or manipulates factory or enterprise data, receives, displays, formats, and/or communicates data, and/or facilitates operation of the system 100. For example, such interfaces 124 can also be associated with an engine, server, client, editor tool or web browser although other type applications can be utilized.

The GUI can include a display having one or more display objects 160 for manipulating the module 110 including such aspects as configurable icons, buttons, sliders, input boxes, selection options, menus, tabs and so forth having multiple configurable dimensions, shapes, colors, text, data and sounds to facilitate operations with the model. In addition, the GUI can also include a plurality of other inputs 170 or controls for adjusting and configuring one or more aspects. This can include receiving user commands from a mouse, keyboard, speech input, web site, remote web service or other device such as a camera or video input to affect or modify operations of the GUI.

Before proceeding, it is noted that the components 120 can include various computer or network components such as servers, clients, programmable logic controllers (PLCs), communications modules, mobile computers, wireless components, control components and so forth which are capable of interacting across the network 114. Similarly, the term PLC as used herein can include functionality that can be shared across multiple components, systems, and or networks 114. For example, one or more PLCs can communicate and cooperate with various network devices across the network 114. This can include substantially any type of control, communications module, computer, I/O device, sensor, Human Machine Interface (HMI)) that communicate via the network 114 which includes control, automation, and/or public networks. The PLC can also communicate to and control various other devices such as Input/Output modules including Analog, Digital, Programmed/Intelligent I/O modules, other programmable controllers, communications modules, sensors, output devices, and the like.

The network 114 can include public networks such as the Internet, Intranets, and automation networks such as Control and Information Protocol (CIP) networks including DeviceNet and ControlNet. Other networks include Ethernet, DH/DH+, Remote I/O, Fieldbus, Modbus, Profibus, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 2:
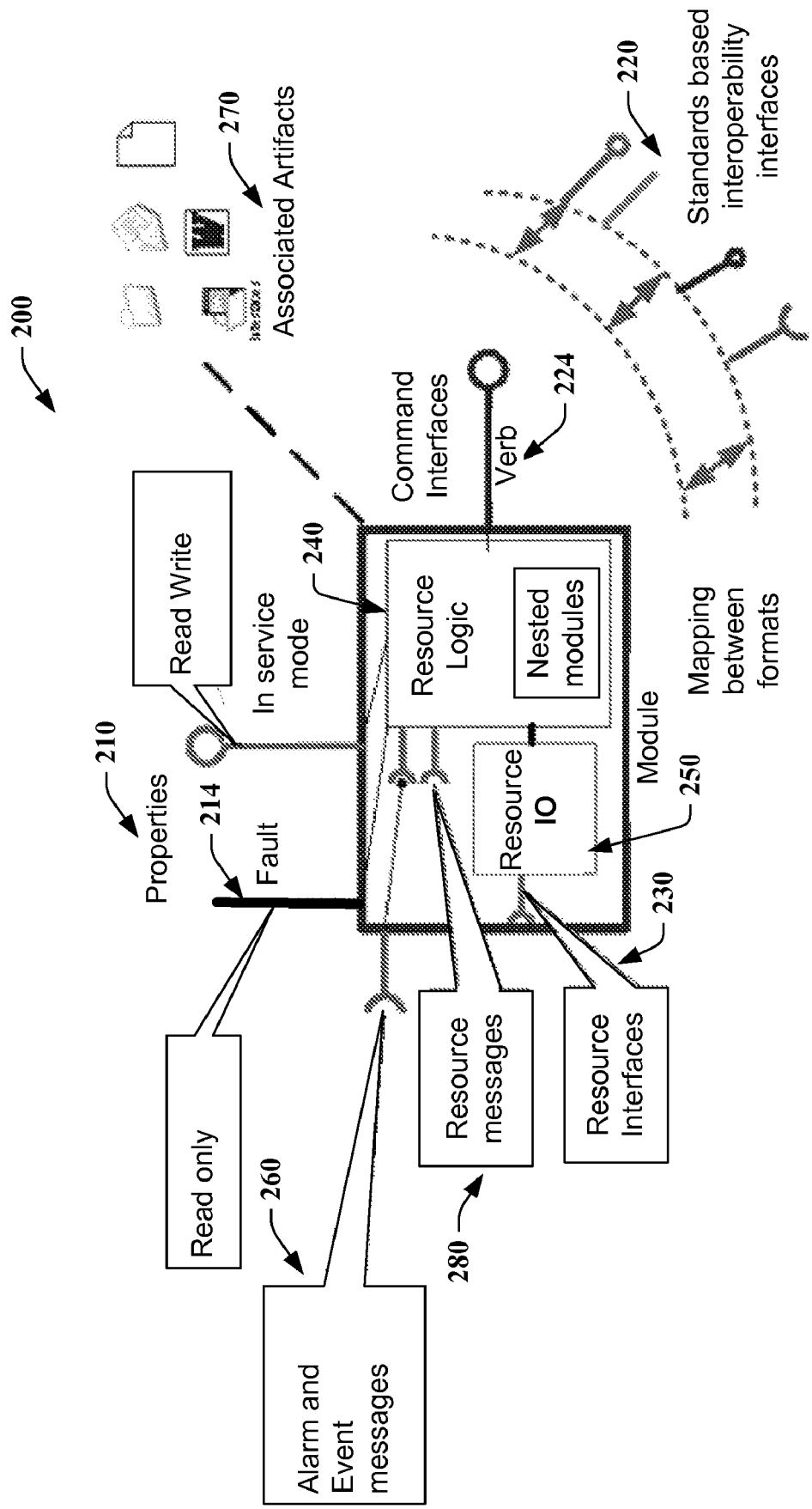
FIG. 2 is a diagram illustrating module attributes.

Referring now to FIG. 2, module attributes 200 are illustrated. The attributes 200 depicted in FIG. 2 include a common (or exemplary) representation that can be modules from modules. Generally, a set of standard attributes can be determined that are common to all modules. Similarly, for other types of modules described below, additional standard attributes can be defined. An example of a property 210 available on modules includes attributes such as Fault and Status at 214. Active resource modules can support additional properties 210 such as available/unavailable.

Attributes presented below are represented associations from the module to objects which may be internal in a common data model (See. FIGS. 8-11) or elsewhere (e.g., CAD Files). At 220, standard public interfaces can be provided. These interfaces 220 publish verbs 224 that are available to external systems and are documented activities that hide the complexity of the underlying code used to implement the interface. Interfaces 220 can be considered into at least two common usage scenarios. For example, interfaces 220 can be used as access points that can be used to hook in real time diagnostics, security and so forth.

Public verbs 224 initiate an action within the module. The activity is described to clients of the interface 220. The implementation is considered private and is not presented to clients—for example, Open, Stop, Abort, Shut, and so forth. A data value property 210 provides public access to information that is used by the module during its operation and can be provided by request values and/or internal values (or an equivalent). The association of logic to transfer request values to internal values and vice versa are referred to as get and set logic for the value. It is noted that in a controller, if there is not a set routine to transfer request values to internal values, the internal value can overwrite the request value on the next scan providing read only capability.

In general, the properties 210 can be considered in at least two classifications. States have special significance for production systems and can have a specific set of values that can be represented by range or enumeration. A state can represent the current status of the primary resource being encapsulated by the module e.g., Percent open, Mode, Service (in, out), and so forth. Information that is used by the module during its operation includes access to data that is provided by interfaces 220. e.g., Conversion Map, Name, Description, expiry date, personnel contact information. Some properties 210 can be common to all instances of resource modules (e.g., scanned copy of resource specification documents), whereas other properties 210 are specific to each module instance (e.g., Status, percent open).

At 230, internal resource interfaces include interfaces from logic 240 in the module to the resource being managed at 250, where the logic includes code and/or configuration that processes a command and/or updates state and data properties. In some cases, this can be hardware such as I/O interfaces, or in other cases it is to subordinate resource control modules that have direct interfaces. Some examples include I/O mapping, material management logic routines, and so forth. These interfaces 230 are internal to the module enabling the modules public interfaces 220 and properties 210 to be the boundary to other system components. Modules that wrap different resources but support the same public properties/interfaces can be exchanged without disrupting interfaces to other components. Generally, I/O mapping and system messaging interfaces are exposed during deployment bind processes. When bound, external interfaces 220 to runtime systems may then consider these interfaces as internal.

At 260, alarm and event messages can be provided which include messages that exposed as runtime messages visible to external systems during the execution of the module. This includes alarms and events explicitly coded by the developer and system messages promoted to be visible by external systems. At 270, one or more artifacts include information that document the operation and structure of the resource such as for example, wiring diagrams, warranties, payroll, parts supplier information, and so forth. Visualization aspects include associated graphics that present the resource state and properties to applications interacting with the resource. For example: faceplates, icons, state overlays, edit dialogs, help files. At 280, system messages allow modules to listen for and publish data model messages to external components. Inbound messages are typically used to manage modules (configure, initialize, propagate properties, and so forth) and publish messages on module activity (resource state, data model messages, and so forth).

Figure 3:
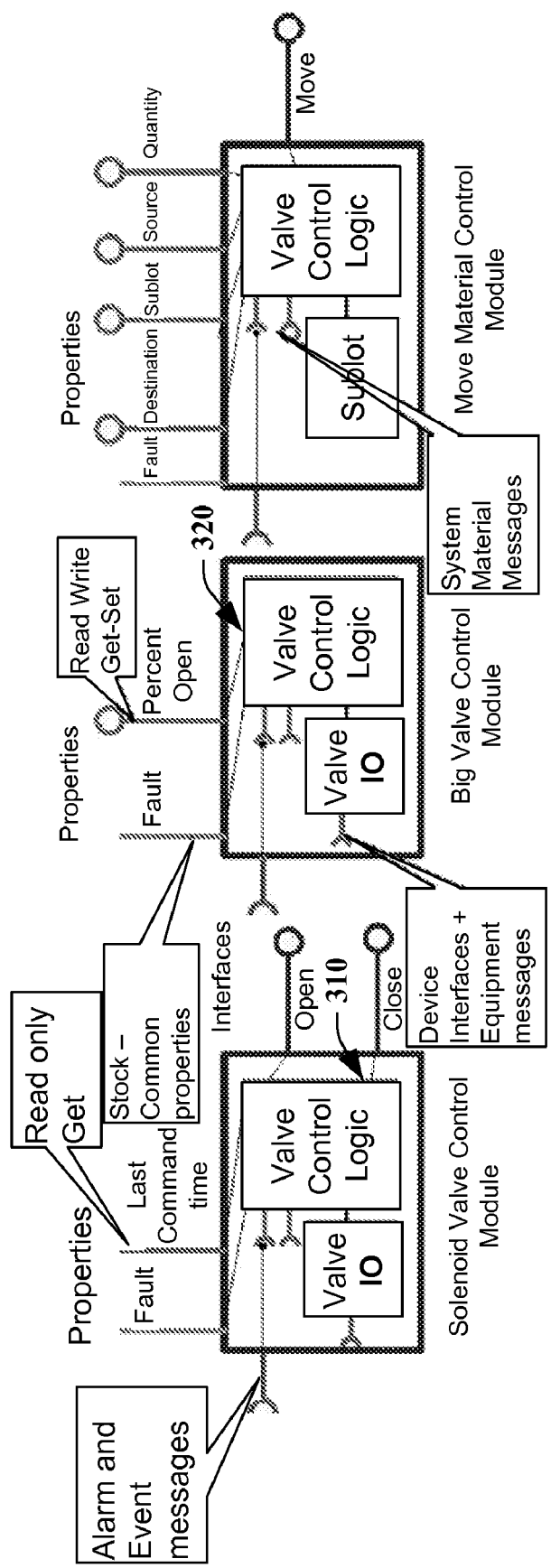
FIG. 3 is a diagram illustrating an HMI developer view of modules.

Turning to FIG. 3, an example HMI developer view of modules 300 is illustrated. In this example, an internal "Module Developers" view of three interconnected modules is illustrated at 300. As can be appreciated, more or less than three modules can be shown in a given view depending upon the application. Generally, the developer of the module can see the inner workings of the module, associated code, and data used to provide the modules behavior. It is noted that resource I/O and logic are modular and can be used to switch between resources internally without changing code. For example, Valves can be changed without changing associated valve control logic at 310,320 thus avoiding revalidation requirements for the logic. Developer views can show all the various attributes described above with respect to FIG. 2 such as properties, interfaces, commands, verbs, messages, and so forth.

Figure 4:
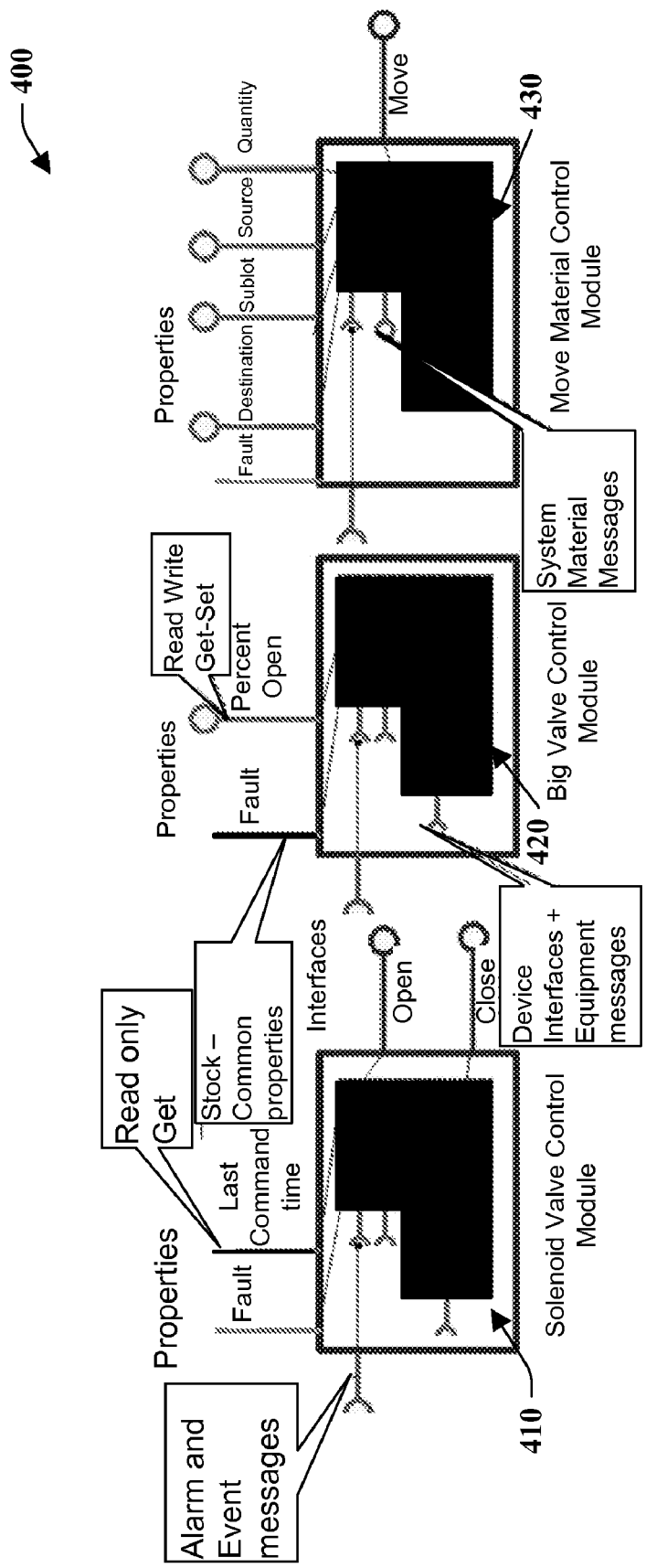
FIG. 4 is a diagram illustrating an HMI deployment manager view of modules.

FIG. 4 illustrates an example HMI deployment manager view of modules 400. During deployment of a module, the modules internal interfaces are bound to system messaging and I/O interfaces. Thus, an administrator can resolve the interface connections required for proper operation of the module both internally and externally. In a validated system, the logic component of the module and possibly some configuration data would be locked down to ensure the module retains its validated configuration. The process of deployment is then validated and associated with the template and/or instance created from the template (note: templates may not always be used in development).

The view of the module presented in a deployment scenario is presented at 400. During deployment, attributes associated with the module are bound to system components. For example, HMI screens are bound to view servers, the module is bound to (downloaded to) the controller, and device I/O on modules are matched to resource I/O in the control module. In some cases, other systems will detect the presence of the extra capability. As shown, logic and resources are hidden from view at 410-430 since these aspects are configured during development, yet the respective module interfaces (inputs and outputs of the modules) for deployment are exposed for use by the administrator. In this manner, the administrator can find and subsequently couple the relevant components of modules to configure a particular application from the modules. Generally, in most cases, the module is not immediately made available to production, yet is available to production when the deployment lifecycle releases the module to production systems. During and after release, external systems can incorporate the module or modules into their respective systems.

Figure 5:
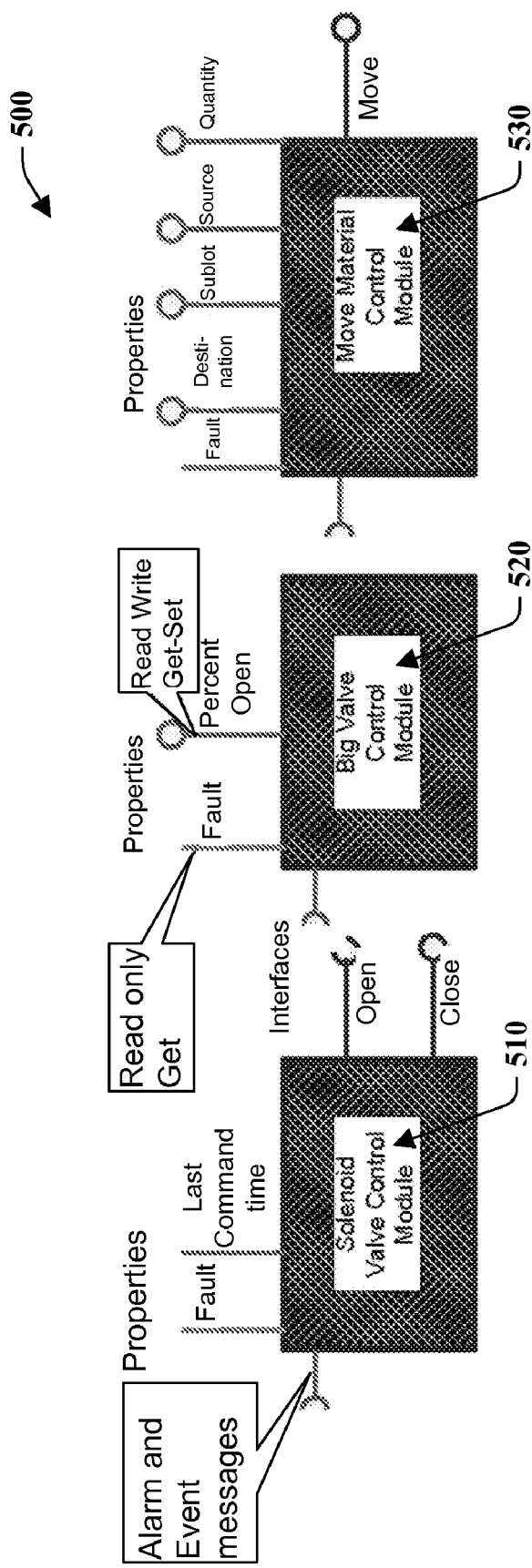
FIG. 5 is a diagram illustrating an HMI client view of modules.

FIG. 5 illustrates an example runtime client view of modules 500. An external "Runtime Clients" view is illustrated at 500. In one example, a runtime client sees a black box representation of the module. This representation includes: Public interfaces with clearly defined semantics; Public properties that can be used to configure the module and report the modules state; and Alarm and event messages that are published by the module. As illustrated, the internal workings of the modules are not shown where merely the function of the module is displayed such as in these examples, solenoid valve control 510, big valve control 520, and move material control 530.

As noted above, a plurality of different views and exposed interfaces are available depending on the type of user or application. These include administrators, developers, designers, maintenance engineers, users, managers, and so forth. For instance, system diagnostics and management applications interact with attributes associated with the module used in conjunction with various scenarios. The state of the module may be presented in production execution views whereas maintenance views may present CAD drawings, I/O wiring diagrams and message logs associated with the module, for example. In these views, associations of a set of information presented is determined by the product/application presenting the information that in turn can be relative to the determined user and their relationship to the particular application.

As can be appreciated, a module can be presented in a number of different perspectives. Examples of these perspectives are equipment view versus process logic view of control modules and material versus material handling logic for material control modules. The choice of view can be dependant on the user configuring or managing the process. A process engineer who is concerned with managing control logic across a plant or enterprise may use a control module focused console whereas a maintenance engineer may prefer an equipment view of the same system.

In a control module centric view, the process engineer can navigate from control module templates, to the instances in an organizational model, and then on to the deployed instances in programmable controllers. They could similarly navigate in the opposite directions, for example locating the control module template from the deployed instance or an instance in the organizational model. Throughout these navigations, a consistent view is provided on the control logic of the modules.

In a similar manner, the maintenance engineer can navigate the same control system via a physical (geographical) view or perhaps through an asset management view. In this situation, the maintenance engineer is not concerned with the control logic, but perhaps is interested in using an HMI terminal to examine the current state of a piece of equipment. Thus, during maintenance navigations, one may not "see" or be exposed to any control logic, but rather have the ability to launch faceplates or view the various properties and artifacts of the equipment.

FIGS. 6-11 illustrate various aspects for HMI presentations. Before proceeding, it is noted that the data described herein can be broader than tag oriented or scalar data values. While interfaces based on tag data are employed in applications that deal with controllers and OPC data, higher level systems often require more complex message based interactions. Since common data model modules can be developed across a wide spectrum of plant applications, additional options are provided in the respective interface. Thus, the user can choose to define the module interface based on one or more of the following examples:

Data—a data based interface is the traditional mechanism to access a module in a controller via tags and/or OLE for Process Control (OPC). Many users develop modules for equipment control using this method. Data based interfaces include attributes such as input or output and externally visible or not visible. These attributes are interpreted by the messaging services to facilitate the interaction of modules.

Messages—a message based interface is commonly used in software modules to facilitate interactions at a higher level. The definition includes the messages sent and received as well as the payloads of each message. In this manner, a message includes more complex data that is delivered as one unit. Again, there are configuration attributes on a message based interface which allow the messaging services to deliver and route the messages. A method is a special case of a message that implies a request/response paradigm in the method exchange. A method may have input and output parameters (again hints to the messaging service) so that some data is sent to the receiving module while other data is returned from it. An event is another special case of a message that implies data broadcast from a module typically with little or no knowledge of who is receiving it. The definition of a broadcast event gives hints to the messaging services on how to deliver the message.

Figure 6:
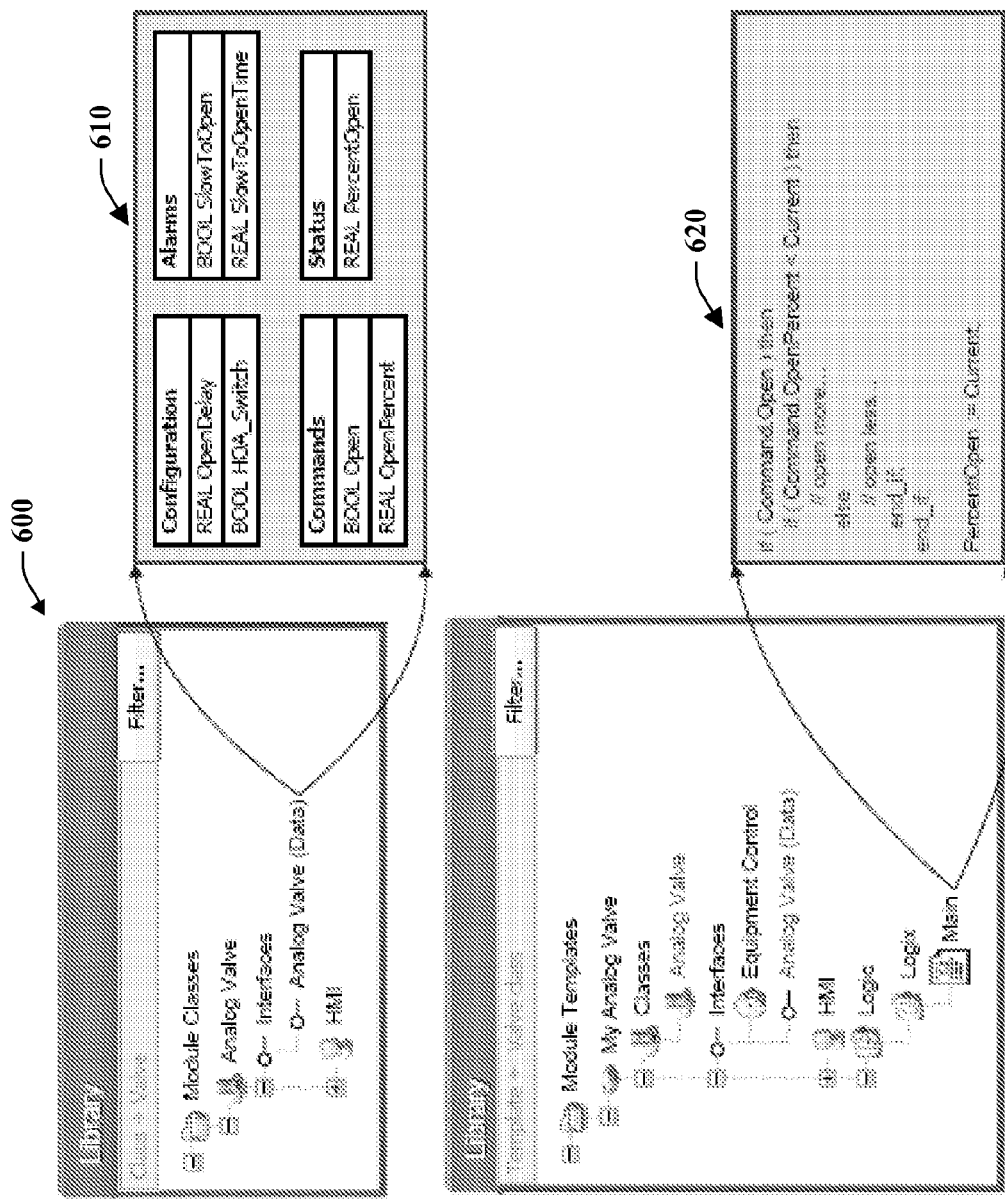
FIGS. 6-11 illustrate example human machine interfaces and concepts.

FIG. 6 illustrates an example data based interface 600. Module interfaces that are based on data can look similar to the user-defined types that engineers use to interact with modules. Commands, status values, alarms, and events of the module are defined in terms of scalar data values such as Booleans (bits), integers, reals, and strings as illustrated at 610. The module logic at 620 then is designed to analyze these data values and perform algorithms or actions based on them.

Figure 7:
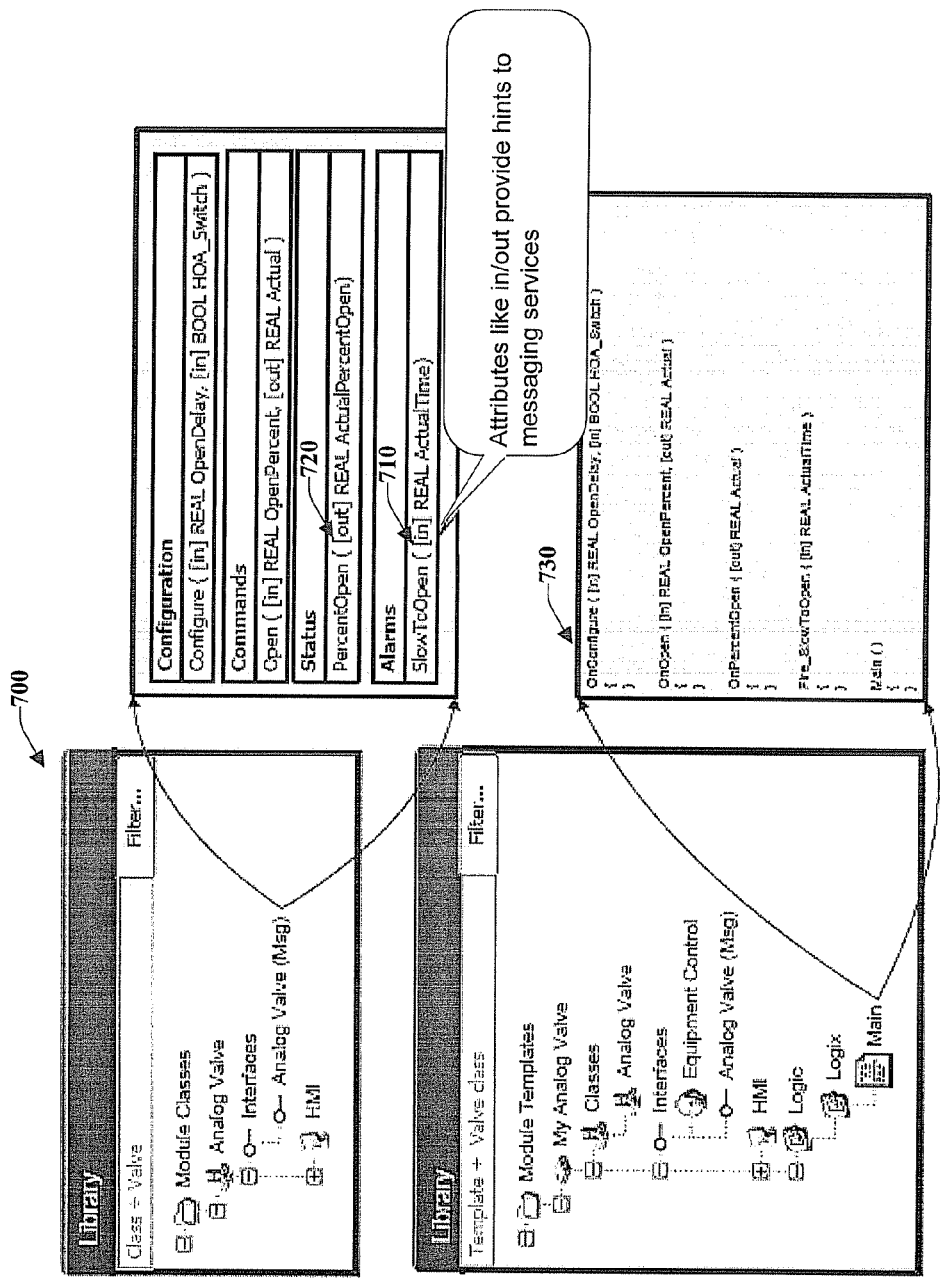

FIG. 7 illustrates an example message based interface 700. Module interfaces based on messages are similar to interface definitions in object oriented programming. The designer defines a set of messages to send to the module (methods) and the messages sent by the module (events). Respective messages can include a set of parameters which are designated as inputs or outputs of the message. The module logic then is designed to respond to and send these messages in combination with the execution of its algorithms. An example, message based interface 700 is shown where attributes such as at 710 or at 720 imply message service functionality, whereas logic at 730 shows communications via such messages.

Figure 8:
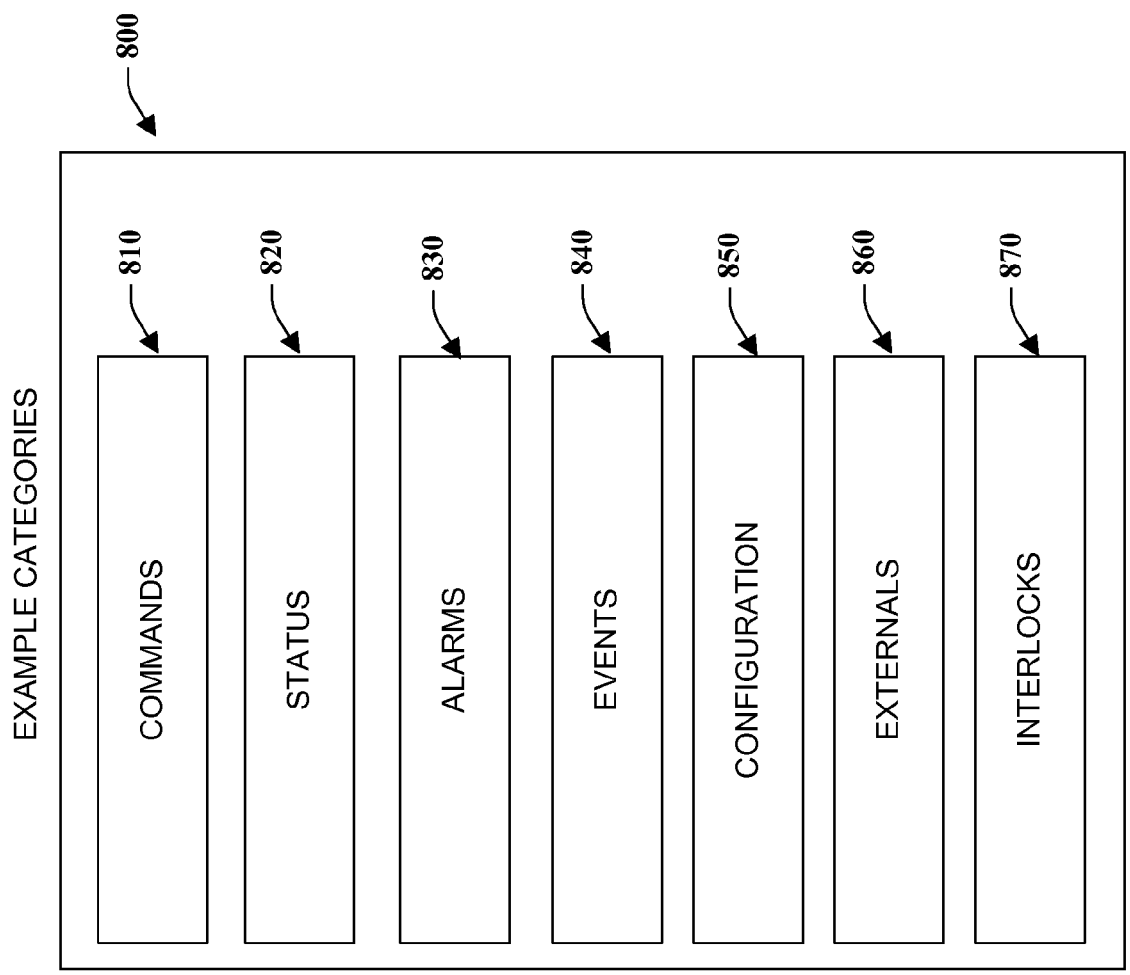

FIG. 8 illustrates example categories 800 that may be employed with human machine interfaces described herein. The common data model (described below with respect to FIGS. 14-17) provides a flexible framework for the definition of the interface for modules, and also a default set of categories for data. These categories 800 can provide mechanisms to configure what applications can access the data and how they interact with it. For example, the data can be an input (write) to the module or an output (read-only) from it. The data be accessed from an operator display, programmatically or both situations. Default access and interaction policies for each category 800 are provided, but the user can also configure them to adjust the system to meet specific needs. The following are some example categories 800 that can be employed.

At 810, commands are sent by the operator to a module from an HMI, MES application, or programmatic software to query the object to do something. These are inputs to the module to request that it performs some action. These could take the form of scalar data values that are written, as methods (with parameters) that are invoked, or as messages (with payload) that are sent. Some users may also want to partition commands into operator versus programmatic commands. This is supported through the addition of separate categories 800. At 820, status data represents the actual state or states (generically) of the control module class. Access to read status data is generally available to all applications. Status data can be configured to include target values, which represents the desired state of the object. This enables the user to track the target versus the actual state.

At 830, categories 800 can include alarms that represent occurrences of an abnormal process, device or system event that typically require operator attention. Alarms include tracking of whether the alarm has been acknowledged or not. Alarms typically clear when the process has returned to normal and the operator has acknowledged the alarm. Additionally, mechanisms to suppress alarms, perhaps during certain process conditions or maintenance activities, are included as part of this category. At 840, events represent occurrences of normal processing that do not typically require operator attention. These might be diagnostic, tracking, material consumption, or audit trail events signaled by the module.

At 850, configuration data is used to set up various features of a module, set ranges to match the process, or provide other static configuration data. Engineering units, raw units, other conversion factors, tuning constants, and other similar items can be provided as configuration data. These are typically accessed from the programming software or from advanced faceplates on the HMI (by authorized personnel). At 860, externals define the links to I/O modules and the field I/O points for the module. This may also include external connections to I/O module health status values, references to other objects, or other external data that the module requires. The externals are typically configured or programmed in the controller, and may not be accessible from an HMI, programmatic control, or MES application. At 870, interlocks are conditions that determine if the control should be disabled or enabled. Certain safety or process conditions may need to be monitored, and if triggered, the module logic should maintain a safe state. Interlocks can also be external conditions that are met for the module to perform an action. Interlocks may or may not include bypasses to allow the operator to manipulate the module even when interlocks exist.

Figure 9:
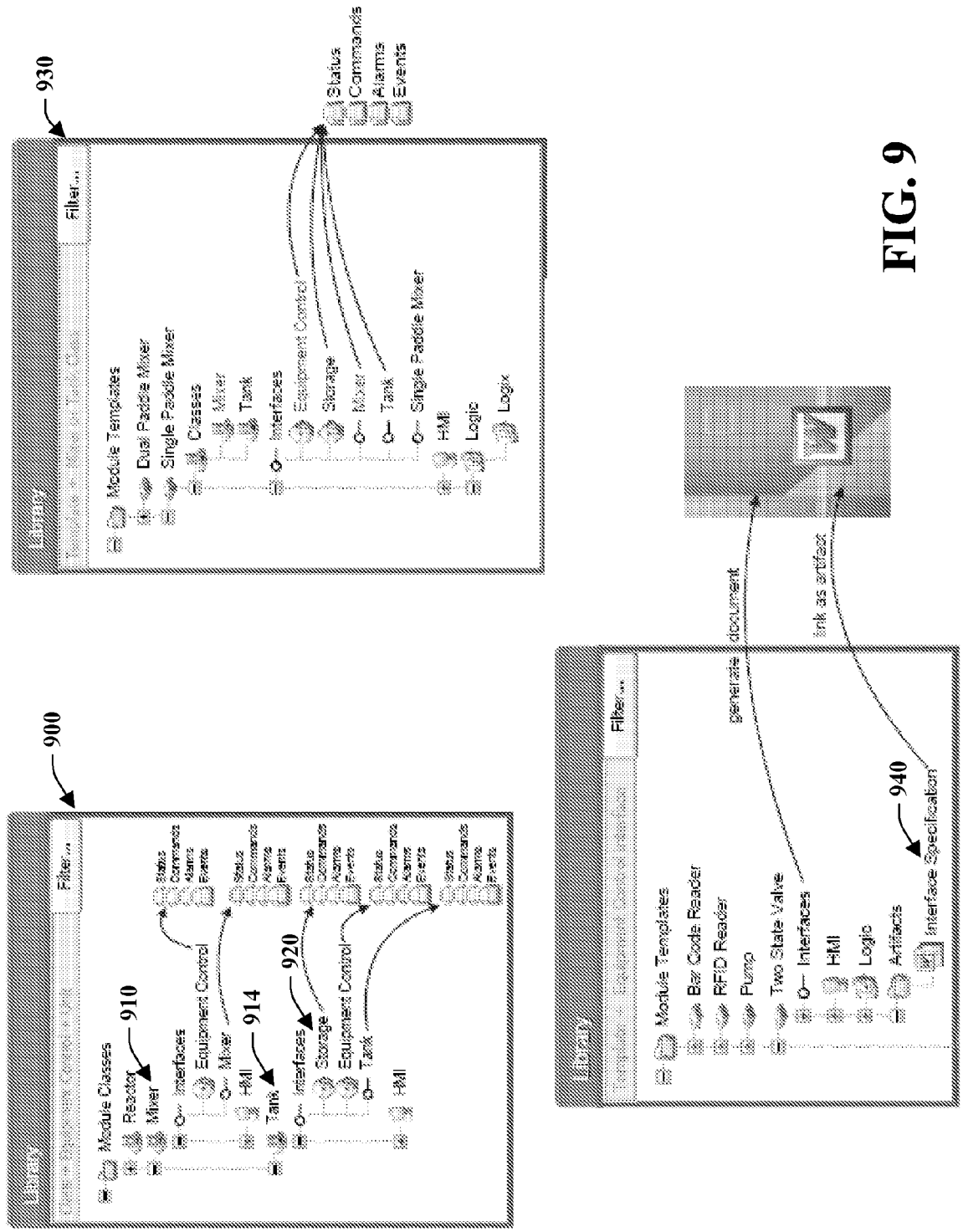

FIG. 9 illustrates example interface scenarios. The definition of a module's interface in terms of the categories of data generally applies to all of the module objects. That is, predefined interfaces are defined in terms of the commands, status, alarms, events, and so forth that are supported. Similarly, the definition of an interface for a module class uses those same mechanisms; and the pattern continues on for module templates and instances.

In an example 900 where the user has defined, two module classes—one for a Mixer 910 and one for a storage Tank at 914, the designer chose to support the equipment control predefined interface for both of these classes, and also added the storage predefined interface to the tank at 920. Since both of these module classes support the equipment control interface, the resulting module template also supports that interface. Since the predefined interfaces only specify behavior, there is no logic to reconcile, and thus, the resulting interface of the module template is analogous to a union of the interfaces from the module classes that it implements. The interface 930 shows how this may appear to the user.

In another aspect, since the interface definition of a module is well structured and encapsulated, the opportunity to generate the module document from its interfaces is provided as shown at 940. This may take the form of a simple printed report, but with evolution of document technologies to standard and open formats, a higher value proposition is to generate a reusable document that can then be associated with the module itself. For example, editor or word application documents using XML formats provided by commercial software vendors can be employed. Since artifacts can be associated with common data model objects, these interface specifications can be generated for a module class, template, or instance.

Figure 10:
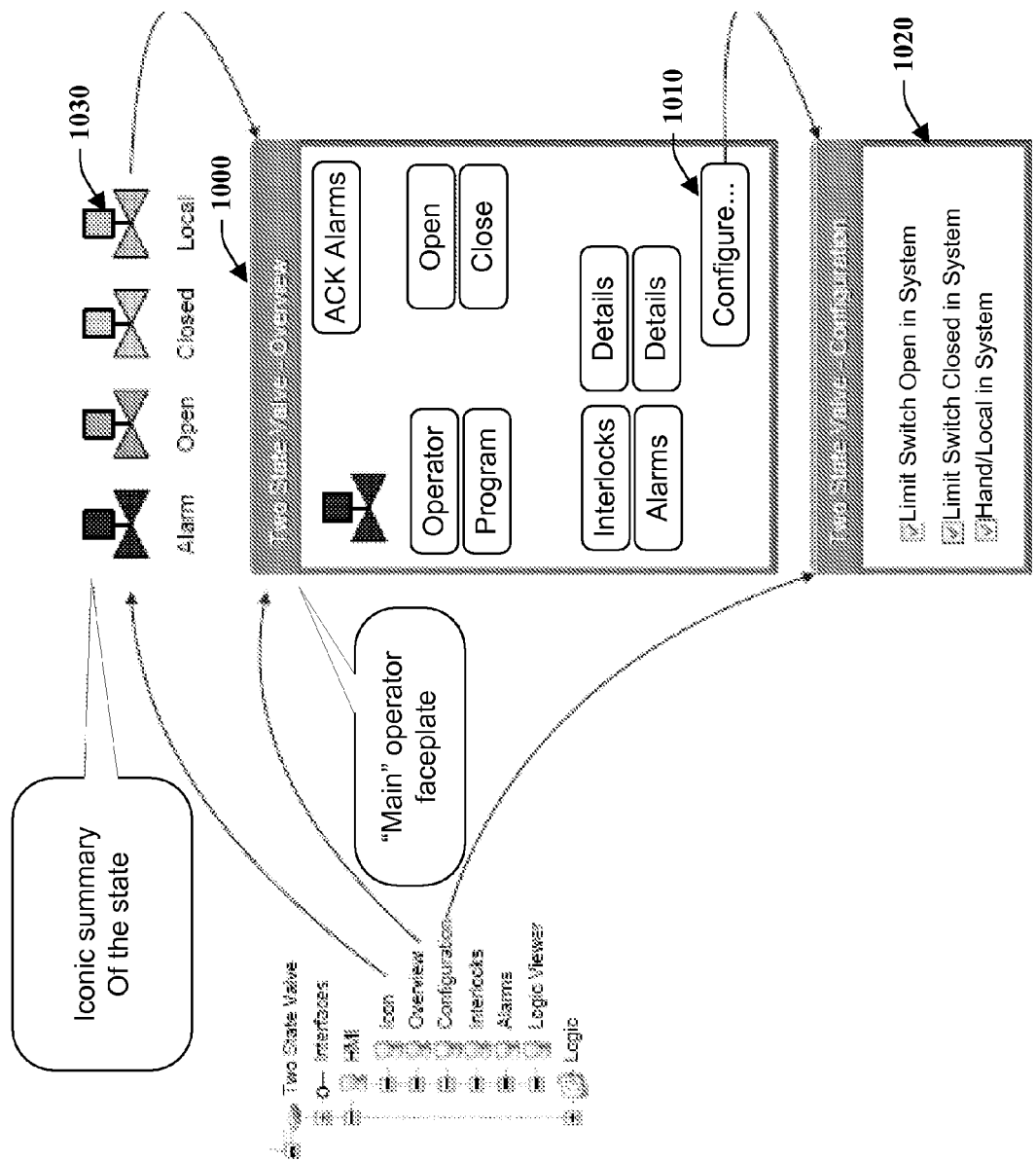

FIG. 10 illustrates example HMI faceplates. As the interface definition of a module class or template promotes consistent dealings with the module at the data or messaging layer, HMI faceplates provide a mechanism for uniform interaction from the operators of the control system. Generally, during the interface definition, the engineer user has configured categories of data (e.g., commands, status, alarms, events) and set the visibility and accessibility rules for that data. The data available for developing the HMI faceplates can thus be constrained by the definition of the interfaces.

In its simplest form, the authoring of the HMI faceplates for a module class or template involves creating a set of graphic displays, hooking them to the data defined in the module's interface, and defining the navigation between these displays. For a Two State Valve example at 1000, various HMI faceplate graphics can be employed. In this example, if an icon faceplate was used on a higher level display, then the operator can navigate to the overview faceplate 1000 from the icon. Likewise, the operator can use the Configure . . . button at 1010 on the overview faceplate 1000 to access a configuration faceplate 1020. Since during the authoring of the faceplate 1000, the data in the screen is bound to the interface of the module, the same HMI faceplate can be used for every instance of the module. When additional displays are created in the HMI, only the module instance needs to be referenced and the system determines the appropriate faceplate based on the interface of the module. There is no additional data binding required. Additionally, because the HMI faceplate 1000 is based on the interface definition of the module, changes to the interface (e.g., the name of a status value) are reflected in the HMI code. That is, the user does not have to manually update the HMI faceplate; the system does it automatically. As shown, various icons can be provided at 1030.

Figure 11:
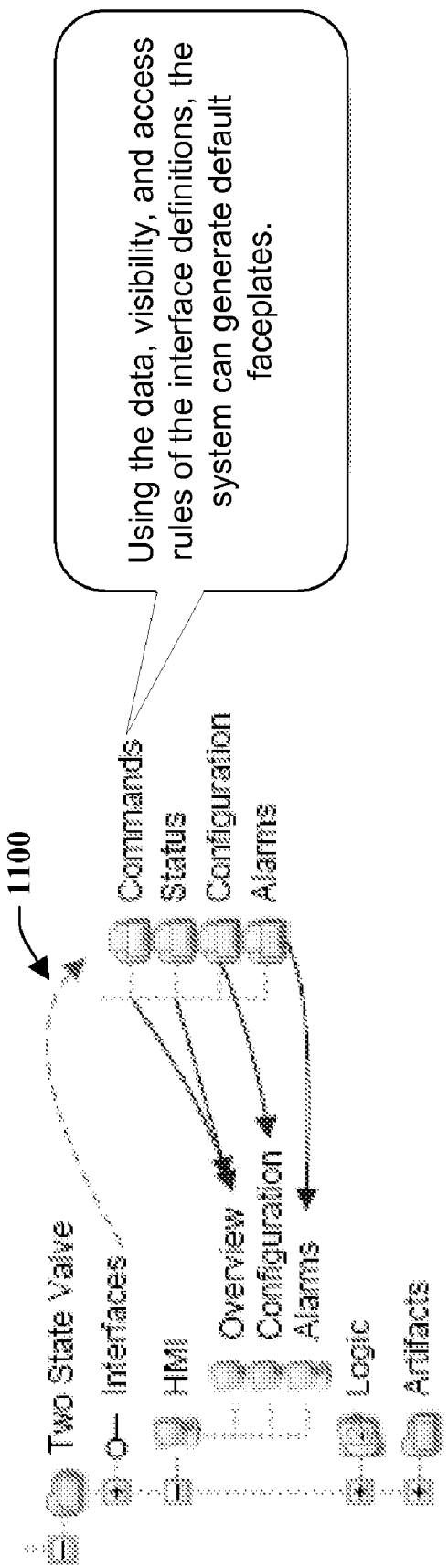

FIG. 11 illustrates aspects for generating default faceplates. The common data model system can provide additional value by generating default HMI faceplates based on the interface definitions of the module as illustrated at 1100. Since the system is aware of the definition of the various categories of data in the module interfaces, it can generate appropriate faceplates. That is, commands to the module can require buttons (or other actuators), status values are to be displayed, alarms are to be displayed and usually require an acknowledge button, configuration values should be read and written, and so forth. Thus, the system can automatically generate these default faceplates which the HMI author uses directly or more likely as a starting point for creating other customized screens.

Figure 12:
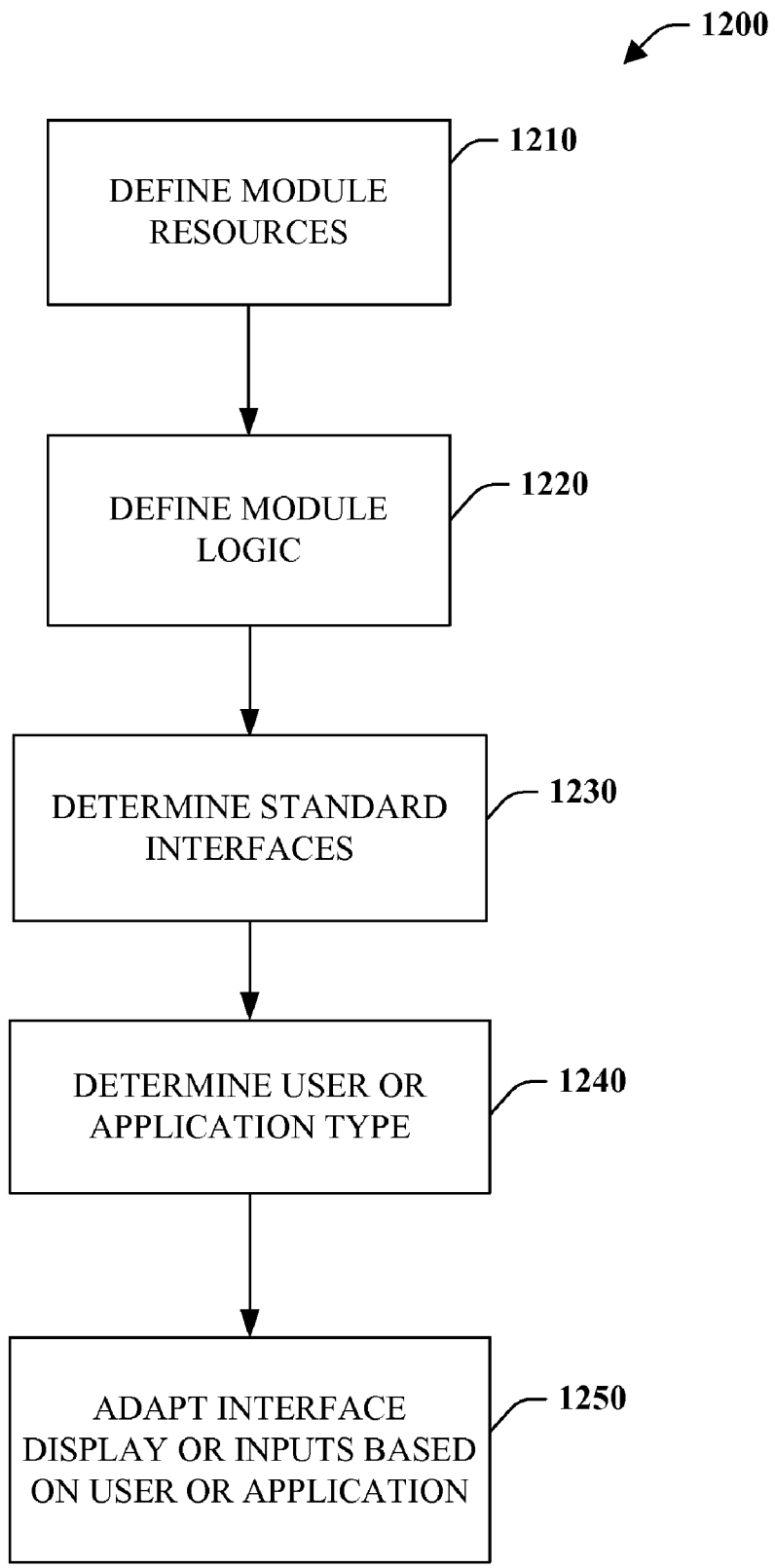
FIG. 12 is a flow diagram illustrating a module interface process.
Figure 13:
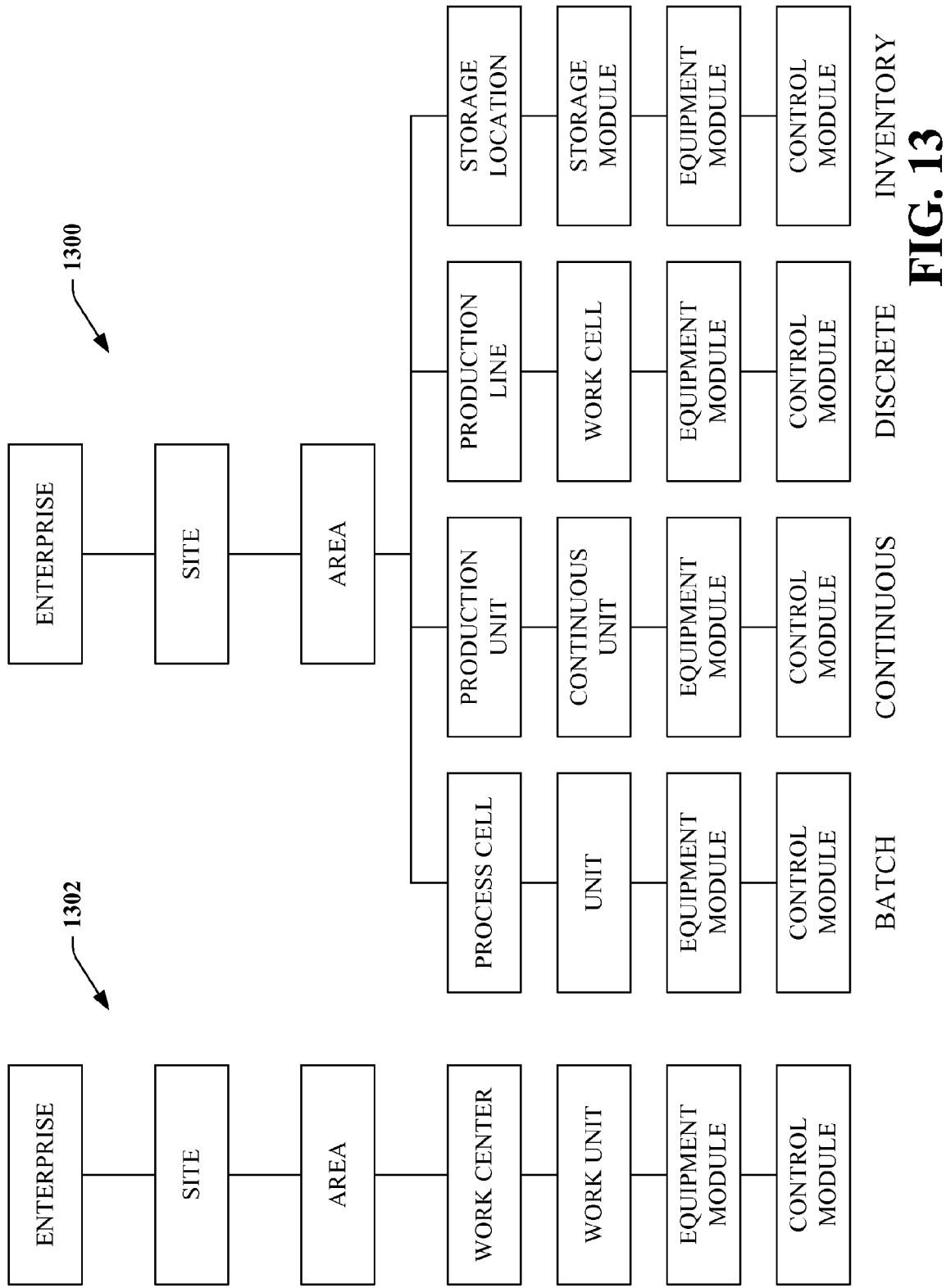
FIGS. 13-16 illustrate a common data model that can be employed with modules in an industrial automation system.

FIG. 12 illustrates a module interface process 1200 for an industrial automation system. While, for purposes of simplicity of explanation, the methodology is shown and described as a series of acts, it is to be understood and appreciated that the methodology is not limited by the order of acts, as some acts may occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology as described herein.

Proceeding to 1210 of FIG. 12, one or more resources are defined for a module. These can include equipment, personnel, segments, storage, computers, control assets and so forth that are defined to perform actions or work in a system. At 1220, module logic is defined. This includes the code (or hardware) that controls the actions defined in 1210. Such code can be of a higher level including structured programming languages and is generally contained within the module and hidden from view. As noted above, it is desired to expose functionality of a module in a generic manner while mitigating details of the inner workings of the module including the respective logic. Depending on the type of user however, module details may be exposed (e.g., Designer). At 1230, one or more standard or generic interfaces are defined for the module. This includes defining high level abstractions for the interfaces rather than specific interfaces directed to a particular product.

At 1240, a type for a user or application is determined. For example, if a user is accessing a design menu for a module, then an interface may be displayed that shows intimate details of the module. If a manager were to view operations of a plant, higher level details such as a module's functions may be exposed or highlighted while hiding more esoteric details such as module code logic. As noted above, user types can be defined for a plurality of different types of users or applications where such determinations can be inferred or queried from a profile of the user, for example. At 1250, an interface is adapted and generated for the type of user or application determined at 1240. As there can be a plurality of different types of users or applications, a plurality of interfaces can be generated, where the respective interface shows or hides depending on the type of user or application determined at 1240.

FIGS. 13-16 illustrate aspects of a common data model noted above. Now turning to FIG. 13, hierarchical representations that can be employed in connection with a schema employed by programmable logic controllers to facilitate use of a hierarchically structured data model are illustrated. The hierarchies illustrated in this figure relate to equipment hierarchies, which can be integrated with procedure hierarchies to generate a robust representation of a plant (which is incorporated within a schema for use in connection with industrial controllers). A first hierarchy 1300 illustrates a representation of equipment within a plant given disparate processes. For instance, a hierarchy in accordance with a batch process can include a representation of an enterprise, site, area, process cell, unit, equipment module, and control module.

In contrast, a hierarchical representation of equipment within a continuous process can include representations of an enterprise, site, area, production unit, continuous unit, equipment module, and control module. In still more detail, an enterprise can represent an entirety of a company, a site can represent a particular plant, an area can represent a portion of the plant, a process cell can include equipment utilized to complete a process, a unit can relate to a unit of machinery within the process cell, an equipment module can include a logical representation of portions of the process cell, and the control module can include basic elements, such as motors, valves, and the like. Furthermore, equipment modules can include equipment modules and control modules can include control modules. Thus, as can be discerned from the figure, four disparate hierarchical representations can be employed to represent equipment within batch processes, continuous processes, discrete processes, and inventory.

A second hierarchy 1302 can be utilized that represents each of the aforementioned hierarchical representations. The hierarchy 1302 can include representations of an enterprise, a site, an area, a work center, a work unit, an equipment module, and a control module. Thus, a common representation can be generated that adequately represents the hierarchy 1300. For purposes of consistent terminology, data objects can be associated with metadata indicating which type of process they are associated with. Therefore, data objects can be provided to an operator in a form that is consistent with normal usage within such process. For example, batch operators can utilize different terminology than a continuous process operator (as shown by the hierarchy 1300).

Metadata can be employed to enable display of such data in accordance with known, conventional usage of such data. Thus, implementation of a schema in accordance with the hierarchy 1302 will be seamless to operators. Furthermore, in another example, only a portion of such representation can be utilized in a schema that is utilized by a controller. For instance, it may be desirable to house equipment modules and control modules within a controller. In another example, it may be desirable to include data objects representative of work centers and work units within a controller (but not equipment modules or control modules). The claimed subject matter is intended to encompass all such deviations of utilizing the hierarchy 1302 (or similar hierarchy) within a controller.

Figure 14:
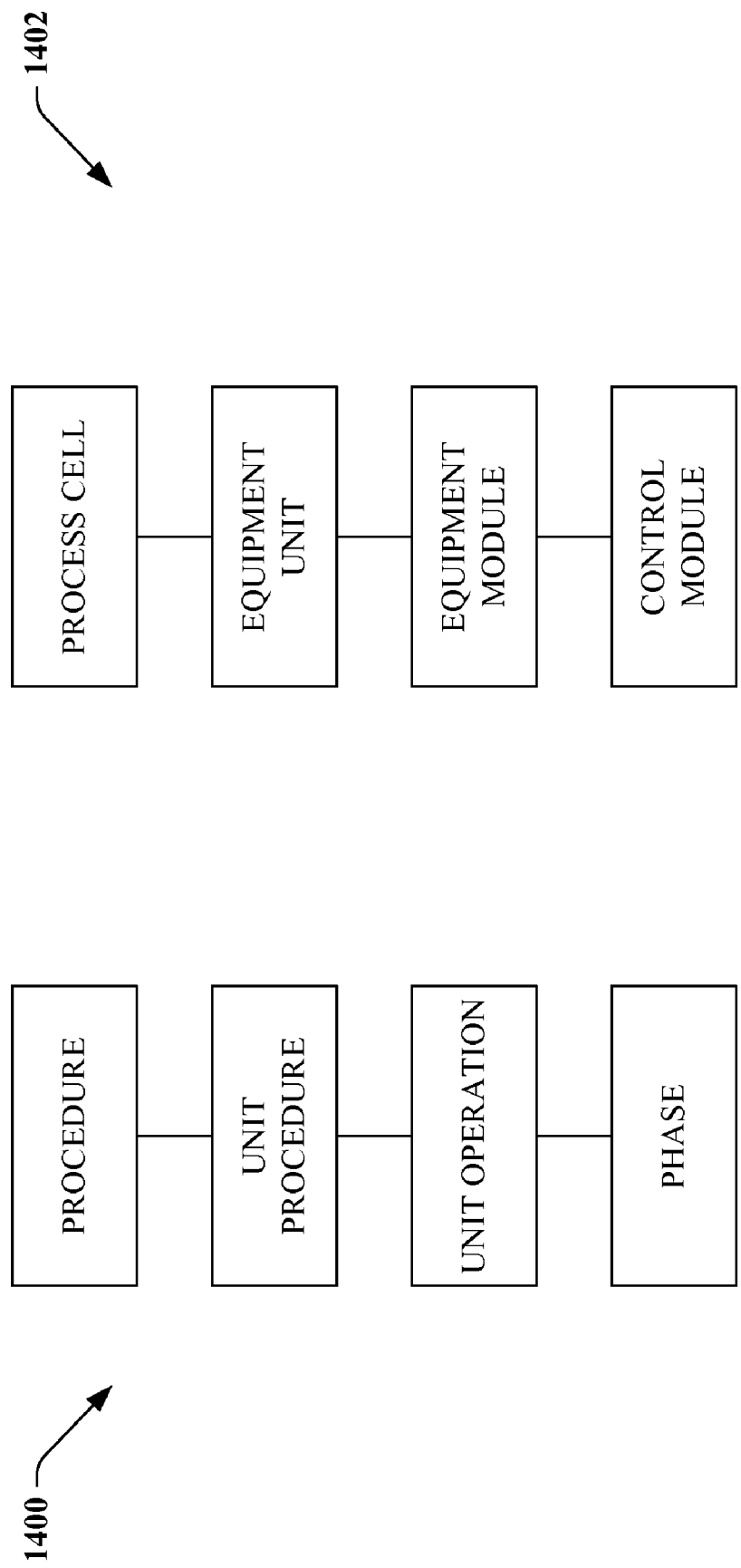

Referring to FIG. 14, standard hierarchies that can be utilized to represent procedures and equipment are illustrated. In particular, a hierarchy 1400 represents procedures that can exist within a batch process. For instance, a procedure can relate to a high-level procedure, such as creation of a pharmaceutical drug. A unit procedure can be more specific, such as adding particular chemicals to a mix by way of a particular unit. A unit operation can be still more specific, and a phase can be yet more specific (relating to operation of low-level machines). For instance, a phase can relate to various states which can exist with respect to low-level equipment, such as stopping, starting, pausing a motor, opening and closing a valve, and the like. A hierarchy 1402 relating to a representation of equipment in, for example, a batch process is displayed adjacent to the hierarchy 1400.

Figure 15:
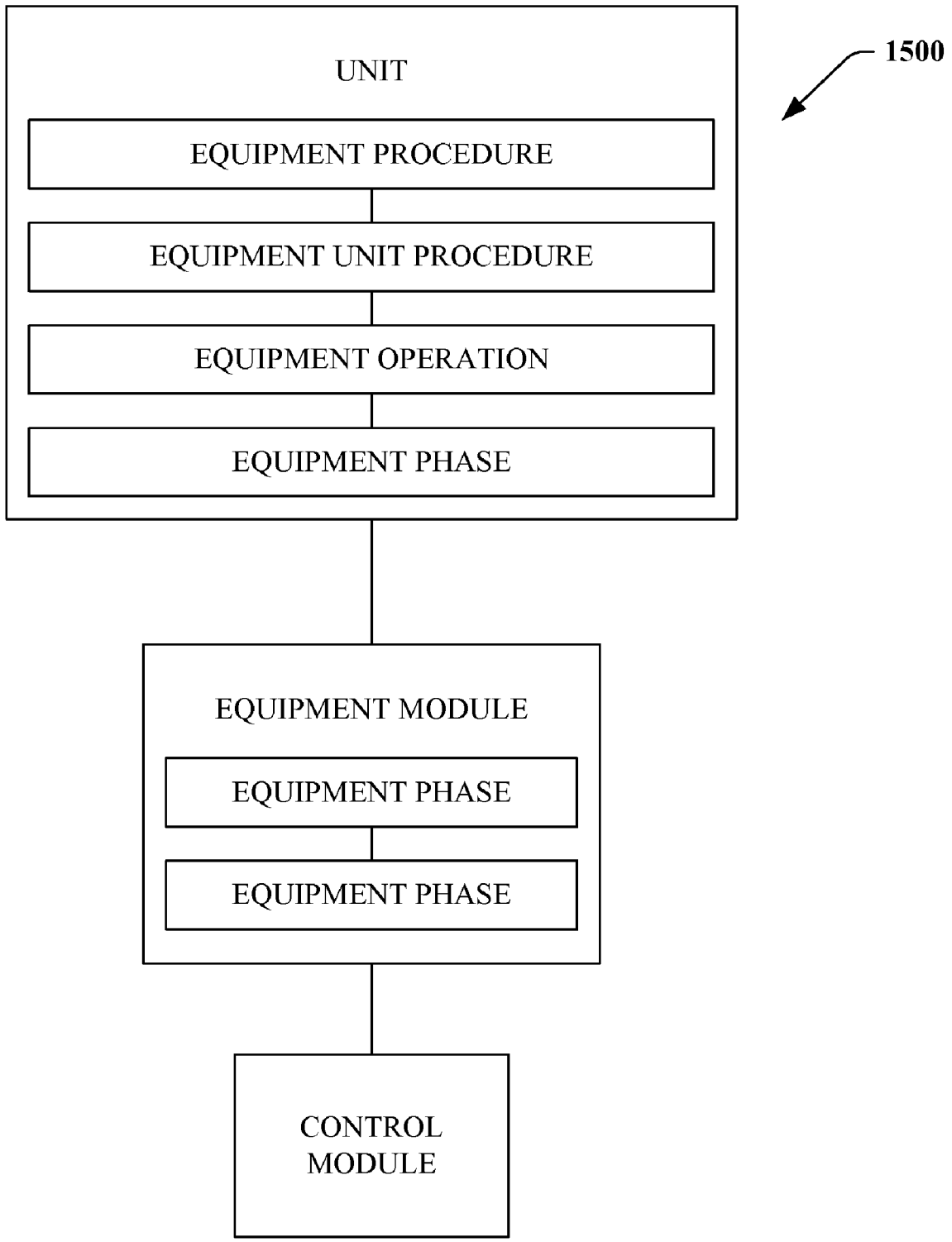
Figure 16:
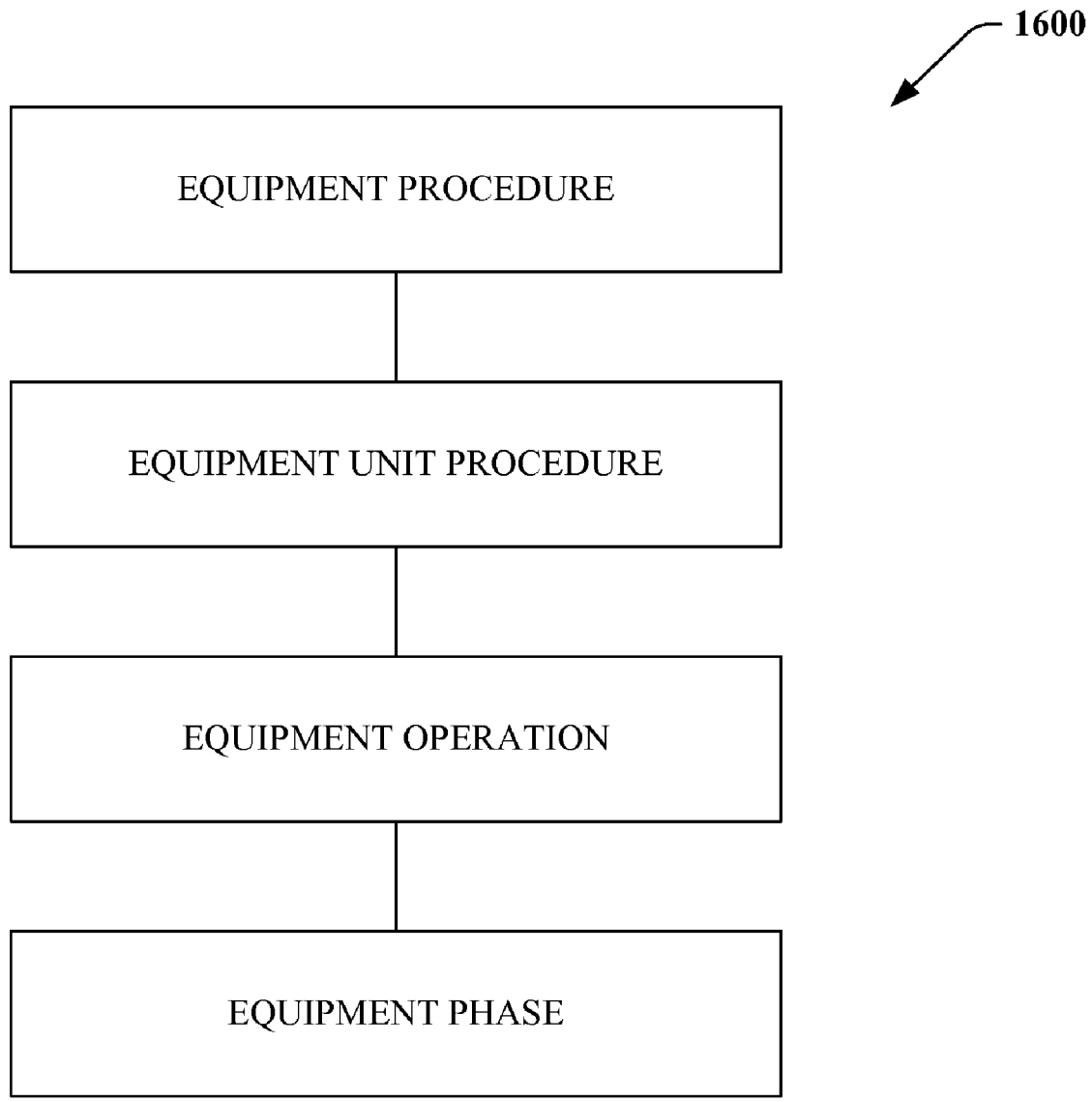

Turning to FIG. 15, a hierarchy 1500 that represents one possible integration of the example hierarchies 1400 and 1402 (FIG. 14). A unit (such as a work unit described in FIG. 13) can be associated with an equipment procedure, an equipment unit procedure, an equipment operation, and an equipment phase. Thus, the procedures, operation, and phase can be associated with a particular work unit. An equipment module can be associated with one or more equipment phases, and can be above a control module in the hierarchy. Referring Briefly to FIG. 16, a hierarchy 1600 that can be utilized in connection with equipment control is illustrated. The hierarchy is substantially similar to that described within the unit portion of the equipment unit. As stated above, the hierarchies illustrated in FIGS. 13-16 can be based upon a standard, such as ISA 88, ISA 95, or other standard. Any suitable representation that can be utilized to model an entirety of a plant, however, is contemplated. Further, the representations shown in these figures can be directly implemented into a controller. For instance, data objects in accordance with any portion of the hierarchies described in FIGS. 13-16 can be existent within a controller, together with state machines that enable creation of such objects.

It is noted that the above modules can be processed on various types of computing devices and resources, where some of these devices may be associated with an industrial control component and other devices associated with standalone or networked computing devices. Thus, computers can be provided to execute the above modules or associated data that include a processing unit, a system memory, and a system bus, for example. The system bus couples system components including, but not limited to, the system memory to the processing unit that can be any of various available processors. Dual microprocessors and other multiprocessor architectures also can be employed as the processing unit.

The system bus can be any of several types of bus structure (s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory includes volatile memory and non-volatile memory. The basic input/output system (BIOS), containing the basic routines to transfer information between elements within the computer, such as during start-up, is stored in nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Computing devices also includes removable/non-removable, volatile/non-volatile computer storage media.

It is to be appreciated that software components can be provided that act as an intermediary between users and the basic computer resources described in suitable operating environment. Such software includes an operating system which can be stored on disk storage, acts to control and allocate resources of the computer system. System applications take advantage of the management of resources by operating system through program modules and program data stored either in system memory or on disk storage. It is to be appreciated that the present invention can be implemented with various operating systems or combinations of operating systems or shared with control systems.

Computers can operate in a networked environment using logical connections to one or more remote computers, such as remote computer(s). The remote computer(s) can be a personal computer, a server, a router, a network PC, a workstation, a microprocessor based appliance, a peer device or other common network node and the like, and typically includes many or all of the elements described relative to computer. Remote computers can be logically connected through a network interface and then physically connected via communication connection. Network interfaces encompass communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL), and wireless networks.

The systems described above employing the authentication protocols can include one or more client(s). The client(s) can be hardware and/or software (e.g., threads, processes, computing/control devices). The systems can also include one or more server(s). The server(s) can also be hardware and/or software (e.g., threads, processes, computing/control devices). The servers can house threads to perform transformations by employing the authentication protocol, for example. One possible communication between a client and a server may be in the form of a data packet adapted to be transmitted between two or more computer processes.

What has been described above includes various exemplary aspects. It is, of course, not possible to describe every conceivable combination of components or methodologies for purposes of describing these aspects, but one of ordinary skill in the art may recognize that many further combinations and permutations are possible. Accordingly, the aspects described herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A human machine interface (HMI), embodied on a computer readable storage medium, for an industrial automation system, comprising:
    a module component, comprising a plurality of modules, the plurality of modules comprising:
    at least one equipment resource control module, comprising:
        a common interface that includes one or more attributes and input/output capabilities that are standard among a plurality of modules; and
        logic of a first platform that controls a state of at least one equipment resource in the industrial automation system;
    at least one material resource control module, comprising:
        the common interface that includes one or more attributes and input/output capabilities that are standard among the plurality of modules; and
        logic of a second platform that controls at least one component in the industrial automation system that manages at least one material resource; and
    at least one resource module that coordinates the at least one equipment resource control module and the at least one material resource control module, wherein the at least one material resource control module is subordinate to the at least one equipment resource control module; and
    a human machine interface (HMI) component that presents a display or a view of at least one of the plurality of modules, the HMI component alters one or more display objects or interface inputs based at least in part on a user role or a type of application.

2. The HMI of claim 1, further comprising one or more module classes and templates that are maintained in libraries, wherein the one or more module classes and templates facilitate access to desired interface functions.

3. The HMI of claim 1, at least one of the plurality of modules includes one or more attributes that are exposed or hidden based on the user role or the type of application.

4. The HMI of claim 3, the one or more attributes include one or more command interfaces.

5. The HMI of claim 4, the one or more command interfaces are used as access points that include one or more of real time diagnostics or security.

6. The HMI of claim 4, the one or more command interfaces include one or more of input/output (I/O) mapping or material management logic routines.

7. The HMI of claim 3, the one or more attributes include one or more alarm and event messages visible to external systems during execution of at least one of the plurality of modules.

8. The HMI of claim 7, the one or more attributes include one or more artifacts that include information that documents an operation or a structure of a resource or an interface.

9. The HMI of claim 1, the display provides at least one of an Organizational View, a Geographical View, or an Asset Management View of at least one of the plurality of modules.

10. The HMI of claim 1, further comprising an application component that determines the user role, determines the type of application that the user has selected, and alters the display or the view.

11. The HMI of claim 10, the application component determines the role based on direct input from the user or inferred from a task.

12. The HMI of claim 1, further comprising a developer view that shows substantially all interfaces, logic, and data of at least one of the plurality of modules, a deployment view that shows administrative elements of interest when configuring a system, a management view for debugging and maintenance of applications, or resource logic views for design and management of a control system.

13. The HMI of claim 12, the developer view, the deployment view, and the management view show at least two module components cooperating to form an application.

14. The HMI of claim 12, the deployment view enables an administrator to resolve interface connections required for proper operation of at least one of the plurality of modules including internal and external connections.

15. The HMI of claim 12, the deployment view facilitates loading of at least one of the plurality of modules component into at least one controller.

16. The HMI of claim 12, the deployment view enables attributes associated with the at least one of the plurality of modules to be bound to one or more system components.

17. The HMI of claim 12, the management view provides a black box representation of the at least one of the plurality of modules where logic and resources are hidden and module component functionality is exposed.

18. The HMI of claim 17, the management view includes public interfaces with defined semantics, public properties that can be used to configure the at least one of the plurality of modules and report a state of the at least one of the plurality of modules, or alarm and event messages that are published by the at least one of the plurality of modules.

19. The HMI of claim 17, further comprising production execution views or maintenance views that present CAD drawings, I/O wiring diagrams or message logs associated with the module component.

20. The HMI of claim 12, further comprising a component that navigates between at least two of the deployment view, the management view or the resource logic views.

21. A method for generating an industrial control interface, comprising:
    employing a processor to execute computer executable code stored on a storage medium to perform the following acts:
    defining a first module, comprising:
        choosing one or more resources that perform one or more actions in an industrial automation system from a plurality of resources, wherein the plurality of resources includes at least two of an equipment resource, a material resource, a segment resource or a storage resource; and
        defining logic to control the one or more actions performed by the one or more resources;
        defining at least one standard interface for the first module independent of a platform of the logic based in part on a user type, an application, and a location; and
        associating the at least one standard interface with at least a second module;
    deploying the first module, comprising binding the first module to at least one run time process that utilizes a hierarchical common data model; and
    altering the at least one standard interface for the module based in part on the user type, the application, and the location.

22. The HMI of claim 11, the application component is associated with one or more classifiers that monitor the application and infer the role from the task.

* * * * *